United States Patent Office 3,449,379
Patented June 10, 1969

3,449,379
TRIPHENYLMETHANE DERIVATIVES
Lawrence Anthony Cescon, Rolf Dessauer, and Catharine Elizabeth Looney, Wilmington, Del., assignors to E. I. du Pont de Nemours and Company, a corporation of Delaware
No Drawing. Filed June 26, 1963, Ser. No. 290,583
Int. Cl. C09b 11/10, 11/14
U.S. Cl. 260—393   4 Claims This invention is directed to novel selected triphenylmethanes and the dyes obtained therefrom by oxidation. More particularly, this invention deals with triphenylmethane derivatives which are valuable because, taken singly, they are capable of forming, by simple oxidation processes, useful gray to black dyes hitherto unavailable.

A single component gray to black dye is valuable in the graphic arts and textile fields for a number of reasons. In printing applications particularly, a single component black dye is preferred to a black color formed by a mixture of dyes. The single dye can be used without changes of shade resulting from unequal rates of exhaustion of dye components from the ink supply, unequal rates of coloration depending on interaction of components with substrates, and off-shade fading because of differences in the light fastness of the component dyes.

In textile coloration, single component gray to black dyes are also preferred to dye mixtures because they obviate concern with unequal exhaustion from the dye bath, unequal application properties depending on dye component-substrate interaction, unequal fading of components, and off-shade discoloration as a result of laundering or dry cleaning. These latter processes also can affect the components of a dye mixture differently.

In textile dyeing with aromatic amine salts like aniline hydrochloride a black color can be developed by oxidation. The oxidation of the aromatic amine must be carefully taken to the proper stage to avoid off-shades which result from either over- or under-oxidation. Even then, the resultant black dye is a complex mixture of oxidation products which individually are susceptible to varying rates of change by laundering and the action of sunlight and thus cause alterations in the color as do the components of a dye formed by mixing selected colors to give black.

Gray and black shades result from a broad absorption of visible light and are not commonly attained by single pure dyes. Ideally, to have a neutral shade, a dye should absorb light uniformly in the visible region of the spectrum. In the spectrum of most of the known single organic dyes two or three absorption bands exist, but their positions and intensities are such that the shade imparted to articles dyed or printed with them is a chromatic color. Single dyes which are neutral in shade are generally weak, and much larger quantities of dye are required to produce a black dyeing than are needed to produce blue or red colorations of corresponding depth with the respective blue and red dyes. In order to obtain satisfactory deep gray or black shades, mixtures of dyes must be employed with the complications described above.

It is clearly desirable to utilize single component gray to black dyes which have high tinctorial strength, if these are available. Dyes of high tinctorial strength are found in the realm of basic dyes, and, particularly, in the area of triarylmethane derivatives. True gray and black shades have not, heretofore, been produced by single dyes of this family. In Venkataraman's Synthetic Dyes, Academic Press, Inc., New York, 1952, p. 722, it is stated: "IG claim that blue-black to green-black dyes are obtained when aromatic polyaldehydes, e.g., terephthalaldehyde, or substances which react like aromatic dialdehydes are condensed with secondary or tertiary aromatic amines and the leuco compounds oxidized in the presence of mineral acids. Such deep shades have not so far been obtained with basic dyes of the triphenylmethane class; on the other hand, it has been stated that by condensing terephthaloyl chloride with dimethyl- or diethylaniline, bistriphenylmethane dyes (di-positively charged dyes) are produced which are somewhat yellower in shade than Malachite Green."

It is, therefore, an object of this invention to provide new compounds which upon oxidation yield monocomponent dyes of gray and black shades. Another object is to provide gray and black dyes of high tinctorial strength and stability. A further object is to provide new, colorless, stable triphenylmethanes which upon oxidation yield gray and black dyes.

These and other objects will become apparent in the following description and claims.

More specifically, the present invention objects are accomplished by triphenylmethane derivatives in which (1) two of the phenyls bear a di-substituted amino group in the 4-position and a methyl, ethyl or fluoro substituent in the 2-position, (2) the third phenyl is substituted in the p-position by an alkylthio, arylthio or aralkylthio group, and (3) the methane carbon atom bears a hydrogen atom, or a hydroxy or cyano group; salts of these derivatives; and dyes derived by the oxidation of the triarylmethane derivatives or their salts. Illustrative of compounds which give colorless leuco dyes, and on oxidation give rise to gray-to-black shades are:

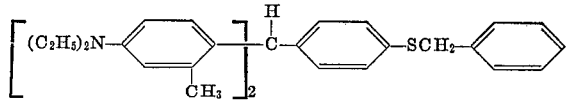

and its dihydrochloride.
One form of the dye obtained therefrom is:

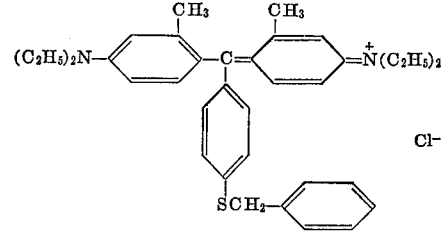

The dyes of this invention are single component coloring products which impart gray or black shades to fibers such as cotton, silk, acrylic fiber, to leather, and to paper in any of its many forms. The novel triphenylmethane leuco dyes of this invention and their salts provide colorless materials which can be conveniently and selectively converted to colored materials. Thus, they have application in areas where rapid, simple color changes are desired, as in photochemical image forming systems as described below.

The new dyes herein described are readily prepared and have high tinctorial strength. They can be used on textiles as gray-to-black self-shades without admixture of other dyes, thus obviating many of the difficulties of mixed shade dyeing. Their high tinctorial value and attractive shades make them useful in graphic arts applications where the brillance of the conventional triarylmethane dyes, such as Malachite Green, Crystal Violet, and Victoria Blue is disadvantageous because of the unattractive contrast of these colors with papers of nearly every hue. These dyes are thus particularly valuable in printing inks, hectograph compositions, and inks for typewriter ribbons and mimeograph stencils.

Furthermore, these novel leuco triphenylmethane compounds are useful in photochemical oxidation processes; for example, the photolysis of hexaarylbiimidazoles on paper treated with the above leuco dyes leads to gray to black images in the exposed areas. With a given amount of leuco dye the density of color is proportional to the amount of radiation. The invention leuco dyes are also useful in other photochemical image forming processes including those in which color is generated when a leuco triarylmethane dye is irradiated in the presence of a halocarbon, such as carbon tetrabromide, hexachloroethane, and the like. The present novel leuco cyanides of this invention become colored on irradiation with ultraviolet light. In solution, the leuco cyanides are phototropic, i.e., the color is discharged after standing in the dark. On some substrates, or in the presence of certain anions, such as arylsulfonic acids, these leuco cyanides form permanent color. Particularly useful compounds for producing a permanent color are cyanuric acid compounds, including cyanuric acid and cyanuric chloride, but especially cyanuric acid esters as disclosed in U.S. Patent 3,079,258.

The dyes and leuco dyes of this invention may exist as salts of inorganic or organic acids. The choice of salt type is dependent on the use to be made of the leuco dyes and their oxidation products. When high water solubility is desired, the chloride dyes or the leuco dye hydrochlorides are preferred. When water insolubility is desired, the phosphotungstate salts of these dyes are preferred. The latter and other heteropoly acid salts are also more lightfast than the chloride salt of the dyes.

The following is included within the scope of the present invention;

(1) A compound having the formula

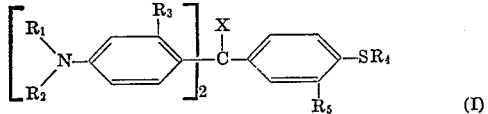

wherein $R_1$ and $R_2$ are $C_1$ to $C_{12}$ alkyl, 2-cyanoethyl, 2-hydroxyethyl, 3-hydroxypropyl, $C_1$ to $C_4$ alkoxy ($C_1$ to $C_4$)alkyl, aralkyl, or aryl; $R_3$ is methyl, ethyl or fluorine; X is hydrogen, hydroxy or cyano; $R_4$ is $C_1$ to $C_8$ alkyl, aralkyl, aryl or aralkyl having fluoro, chloro, alkyl or alkoxy substituents; and $R_5$ is hydrogen or $C_1$ to $C_4$ alkyl; the salts of organic and inorganic acids thereof, and the cationic oxidation products thereof.

(2) A compound defined in (1) above wherein $R_3$ is methyl.

(3) A compound having the formula

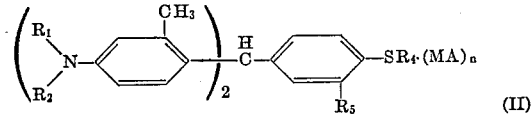

wherein $R_1$, $R_2$, $R_4$ and $R_5$ are defined as in (1) above, M is hydrogen or zinc, A is an anion, and $n$ is an integer 1 or 2.

(4) A dye having the formula

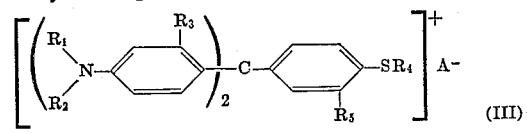

wherein $R_1$, $R_2$, $R_3$, $R_4$ and $R_5$ are defined as in (1) above and $A^-$ is an anion.

(5) A light-sensitive composition consisting of an intimate admixture of (1) an acid salt of the leuco dye defined in (1) above wherein X is H, (2) a 2,4,5-triarylimidazolyl dimer of the formula

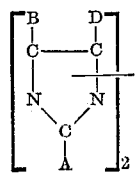

wherein A, B, and D are selected from the group consisting of alike, different and substituted radicals of homo- and heterocyclic aromatic systems, said dimer being dissociated into free radicals when irradiated with ultraviolet light, and optionally (3) an inert solvent and (4) an inert, transparent polymeric binder, said composition being sensitive to light with a wave length from about 2000 A. to about 4200 A.

(6) A light-sensitive composition consisting of the leuco dye defined in (1) above and a halocarbon selected from the group of halogen-containing hydrocarbons which on exposure to radiation of suitable wave length generate a halogen free radical, specifically carbon tetrabromide.

Each of the heretofore described inventive features establishes, intoto, and singly, a novel contribution to the art.

Novel triphenylmethanes, as heretofore defined and which upon oxidation are converted to novel dyes of gray or black shades, include the following listed representative illustrations. The illustrations are made in the form of the free base of the compounds, although the compounds are frequently used in the form of a salt.

(1) Bis[4-(N-benzyl-N-ethylamino)-o-tolyl](p-benzylthiophenyl)methane.
(2) Bis[4-bis(2-cyanoethyl)amino-o-tolyl](p-benzylthiophenyl)methane.
(3) Bis[4-bis(2-ethoxyethyl)amino-o-tolyl](p-benzylthiophenyl)cyanomethane.
(4) Bis[4-bis(2-hydroxyethyl)amino-2-ethylphenyl](p-benzylthiophenyl)methane.
(5) Bis[4-bis(2-hydroxyethyl)amino-2-fluorophenyl](p-benzylthiophenyl)methane.
(6) Bis[4-bis(2-hydroxyethyl)amino-2-fluorophenyl](p-benzylthiophenyl)methane.
(7) Bis[4-bis(2-hydroxyethyl)amino-2-fluorophenyl](p-benzylthio-m-butylphenyl)methane.
(8) Bis[4-bis(2-hydroxyethyl)amino-o-tolyl](p-[(p-fluorobenzylthio)phenyl]methane.
(9) Bis[4-bis(2-hydroxyethyl)amino-o-tolyl](4-benzylthio-m-tolyl)methane.
(10) Bis[4-([2-cyanoethyl][2-hydroxyethyl]amino)-o-tolyl](p-benzylthiophenyl)methane.
(11) Bis[4-(12-cyanoethyl][2-hydroxyethyl]amino)-2-ethylphenyl](p-benzylthiophenyl)methane.
(12) Bis(4-dibutylamino-o-tolyl)(p-benzylthiophenyl)methane.
(13) Bis(4-didodecylamino-o-tolyl)(p-benzylthiophenyl)methane.
(14) Bis(4-diethylamino-2-ethylphenyl)(p-benzylthiophenyl)methane.
(15) Bis(4-diethylamino-2-fluorophenyl)(p-benzylthiophenyl)methane.
(16) Bis(4-diethylamino-o-tolyl)(p-benzylthiophenyl)cyanomethane.
(17) Bis(4-diethylamino-o-tolyl)(p-benzylthiophenyl)methane.
(18) Bis(4-diethylamino-o-tolyl)(p-benzylthiophenyl)methanol.
(19) Bis(4-diethylamino-o-tolyl)(4-benzylthio-m-tolyl)methane.
(20) Bis(4-diethylamino-o-tolyl)[p-(p-chlorobenzylthio)phenyl]methane.
(21) Bis(4-diethylamino-o-tolyl)(p-butylthiophenyl)methane.
(22) Bis(4-diethylamino-o-tolyl)(p-ethylthiophenyl)methane.
(23) Bis(4-diethylamino-o-tolyl)[p-(p-methoxybenzylthio)phenyl]methanol.
(24) Bis(4-diethylamino-o-tolyl)[p-(o-methylbenzylthio)phenyl]methane.
(25) Bis(4-diethylamino-o-tolyl)[p-(p-methylbenzylthio)phenyl]methane.
(26) Bis(4-diethylamino-o-tolyl)(p-methylthiophenyl)methane.
(27) Bis(4-diethylamino-o-tolyl)(p-octylthiophenyl)methane.

(28) Bis(4-diethylamino-o-tolyl)(p-phenylthiophenyl) methane.
(29) Bis(4-diethylamino-o-tolyl)[p-(o-tolylthio)phenyl] methane.
(30) Bis(4-dimethylamino-o-tolyl)(p-benzylthiophenyl) methane.
(31) Bis(4-dipropylamino-o-tolyl)(p-benzylthiophenyl) methane.
(32) Bis[4-(N-[2-ethoxyethyl]-N-ethylamino)-o-tolyl] (p-benzylthiophenyl)methanol.
(33) Bis[4-(ethylmethylamino)-o-tolyl](p-benzylthiophenyl)cyanomethane.
(34) Bis[4-(N-methylanilino)-o-tolyl](p-benzylthiophenyl)methanol.

The critical feature of the present novel class of compounds which makes them novel and capable of providing useful colors of gray and black shades is the ethyl, fluoro, or methyl substituent in the 2-position in combination with the di-substituted amino groups in the 4-position of the two phenyls taken together with the p-substituted mercapto in the third phenyl, i.e.,

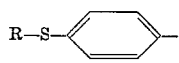

The pronounced and unexpected effect of this combination of substituents is illustrated by the following set of compounds and the colors of their dye products. Bis(4-diethylaminophenyl)phenylmethane,

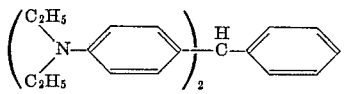

having neither a substituent in the 2-position of the phenyls bearing the diethylamino groups nor a substituent in the remaining phenyl, yields a green dye. Bis(4-diethylaminophenyl)(p-benzylthiophenyl)methane,

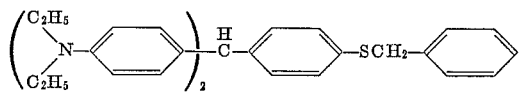

having no substituent in the 2-position of the phenyls bearing the diethylamino groups but having a p-benzylthio substituent in the remaining phenyl, provides also a green dye. Bis(4-diethylamino - o - tolyl)(p - phenylsulfonylphenyl)methane,

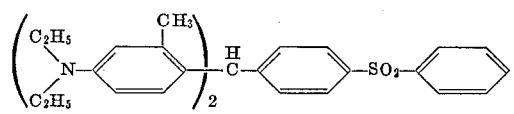

having a methyl substituent in the 2-position of the phenyls bearing the diethylamino groups to give 4-diethylamino-o-tolyls and having no substituted mercapto phenyl attached to the carbon atom, is oxidized to a green dye. A similar compound having the p-phenylsulfonyl replaced by p-diethylamino yields a blue dye. Bis(4-diethylamino-2-methyl (or ethyl or fluoro) phenyl)(p-benzylthiophenyl)methane,

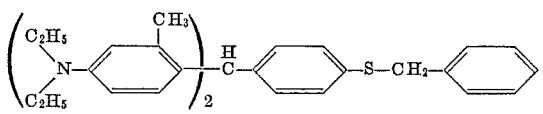

however, having both the selected substituent in the 2-position of the phenyls bearing the p-diethylamino groups and a substituted mercapto group, such as benzylthio, in the p-position of the remaining phenyl, forms a gray dye. Other substituents on the amino nitrogen, other substituents attached to the sulfur of the thiophenyl, and substituents in the 3-position of the phenyl bearing the thio radical may be present as shown in Formula I and in the list of representative compounds. But if the methyl, ethyl, or fluoro substituent of bis(4-diethylamino-2-methyl (or ethyl or fluoro) phenyl)(p-benzylthiophenyl)methane is replaced with chlorine, the resulting dye is purple.

In addition to the selectively substituted triphenylmethane derivatives, the same derivatives of methanol (X=OH)

and cyanomethane (X=CN) are embodied in the invention and provide the same gray and black dyes having high technical value so long as the triphenylmethanols and triphenylcyanomethanes bear as substituents the combination of a methyl, ethyl, or fluorine in the 2-position of the phenyls having di-substituted amino groups in the 4-position and an alkyl-, aryl-, or aralkyl-substituted mercapto in the p-position of the third phenyl.

The cationic triphenylmethane type dyes obtained from the invention triphenylmethanes, methanols, and cyanomethanes are purposely represented by Formula III with an apparent trivalent methane carbon atom in recognition of the resonance shifts of electrons that exist in compounds of this type. Several electronic configurations are possible as shown by Krahler in The Chemistry of Synthetic Dyes and Pigments, American Chemical Society Monograph No. 127, p. 229, Reinhold Publishing Co., 1955.

Preparation of compounds and dyes

The invention compounds are synthesized by various procedures which have been employed for the preparation of triarylmethane dyes. Of these procedures, the following are mentioned as representative of those by which the invention triphenylmethanes are prepared.

(a) The condensation of benzaldehyde having an

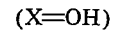

group in the p-position with an N,N-disubstituted-3-methyl (or ethyl or fluoro) aniline:

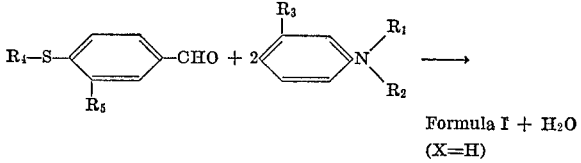

Formula I + H₂O
(X=H)

wherein the R's above as well as in the equations below have the same significance as assigned earlier in the specification.

(b) The condensation of an α,α-dialkoxy p-tolyl alkyl (or aryl or aralykyl) sulfide with an N,N-di-substituted-m-toluidine:

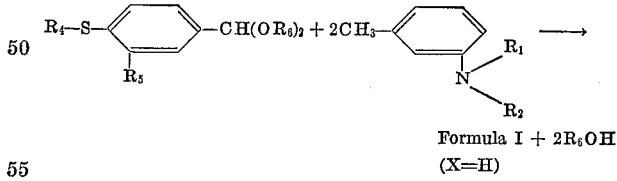

Formula I + 2R₆OH
(X=H)

wherein R₆ is ethyl or methyl.

(c) The condensation of a bis[4-N,N-di-substituted amino-2-ethyl (or fluoro or methyl) phenyl]methanol with a phenyl alkyl (or aryl or aralkyl) sulfide:

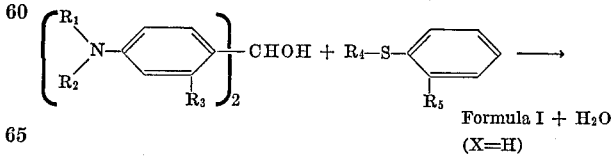

Formula I + H₂O
(X=H)

The corresponding methanols are prepared by oxidizing the methane derivatives in an alkaline medium, and the corresponding cyanomethanes are prepared by treating the oxidized methane derivatives with an alkali metal cyanide.

The invention triphenylmethanes, methanols, and cyanomethanes are readily converted to the corresponding dyes by chemical or photochemical processes. Among the chemical processes are oxidation with lead dioxide (PbO₂), chloranil, sodium dichromate, manganese dioxide, and nitrosyl sulfuric acid in aqueous solution or a solution with an organic solvent. A photochemical process consists of exposing to ultraviolet light the triphenylmethane compound and a photo-oxidant preferably in the presence of a small amount of solvent.

Some of the invention dyes may also be prepared directly from an appropriately substituted benzophenone and an N,N-dialkyl-m-toluidine:

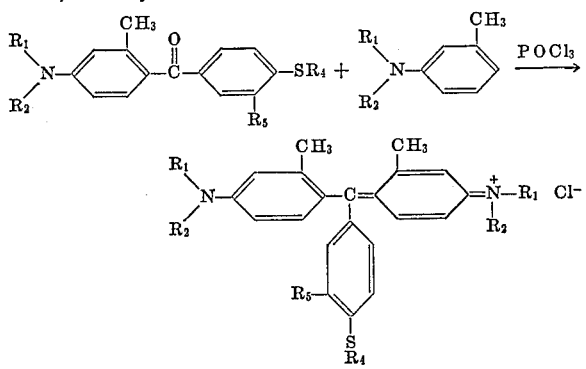

wherein the R's represent the same groups as already defined.

The invention dyes may be converted to insoluble salts, referred to as pigment dyes, for the direct coloring or printing of textile fibers and fabrics and for use as pigments for coating compositions by treatment with such an acid as phosphotungstic, phosphomolybdic, phosphotungstomolybdic, and the like. Usually, the dyes exist in a water-soluble cationic form with an anion to balance the positive charge residing in the dye configuration. This anion is obtained from inorganic and organic acids such as, for example, hydrochloric, hydrobromic, hydrofluoric, phosphoric, sulfuric, oxalic, p-toluene-sulfonic.

The anion may also result from the formation of a zinc chloride complex. This same group of inorganic and organic acids is also used to form salts of the colorless invention triphenylmethane compounds.

The 2,4,5-triarylimidazolyl dimers which may be used in light-sensitive compositions with the acid salts of the invention leuco dyes described above comprise triarylimidazolyl radicals containing aryl groups derived from both homocyclic and heterocyclic aromatic compounds. Such aryl groups are phenyl, tolyl, xylyl, naphthyl, thienyl and the like. The aryl groups may be alike or different and bear substituent groups as shown in the present assignee's copending application Ser. No. 234,538. The preferred 2,4,5-triarylimidazolyl dimers are those of 2-(o-bromophenyl)-4,5-diphenylimidazolyl
2-(o-bromophenyl)-4-(p-bromophenyl)-5-phenyl-
    imidazolyl
2-(o-butoxyphenyl)-4,5-diphenylimidazolyl
2-(o-t-butylphenyl)-4,5-diphenylimidazolyl
2-(o-chlorophenyl)-4,5-bis(p-methoxyphenyl)imidazolyl
2-(o-chlorophenyl)-4-phenyl-5-(p-methoxyphenyl)
    imidazolyl
2-(o-ethoxyphenyl)-4,5-diphenylimidazolyl
2-(o-fluorophenyl)-4,5-diphenylimidazolyl
2-(o-methoxyphenyl)-4,5-diphenylimidazolyl
2-(o-methoxyphenyl)-4-(p-methoxyphenyl)-5-phenyl-
    imidazolyl
2-(p-methoxyphenyl)-4,5-diphenylimidazolyl
2-(1-naphthyl)-4,5-diphenylimidazolyl
2-o-tolyl-4,5-diphenylimidazolyl
2,4,5-tris(o-chlorophenyl)imidazolyl
2,4,5-triphenylimidazolyl, itself.

The above dimers are prepared from triarylimidazoles corresponding to the imidazolyls. The triarylimidazoles are prepared by reacting benzil or a substituted benzil with benzaldehyde or a substituted benzaldehyde as described by Davidson et al., J. Org. Chem. 2, 319 (1937) or as shown in Belgian Patent No. 589,417. The intermediate triarylimidazoles are then oxidized to the dimers with potassium ferricyanide as described by Hayashi et al., Bull. Chem. Soc. Japan, 33, 565 (1960).

Among the solvents which optionally may be employed in the light-sensitive composition are formamide, N,N-dimethylformamide, N,N-dimethylacetamide, hexanamide, stearamide, methanol, ethanol, 1-propanol, 2-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, dicyanocyclobutane, 1 - methyl - 2 - oxohexamethylenimine and mixtures of these solvents in the proportions that may be required to dissolve the particular leuco dye and imidiazolyl dimer selected for use in a composition.

The double bonds of the 2,4,5-triarylimidazolyl dimer utilized in the present novel light-sensitive composition exist but vary as to location in the imidazolyl ring of said dimer; the location of said double bonds is in accordance with the position of the linkage between the radicals forming said dimer; said double bonds satisfy the valences of the carbon and ring nitrogens.

The solvent or mixture of solvents provides a fluid medium for mixing the solid components of the composition, i.e., the leuco dye and the dimer, and for applying the composition to substrates. The solvent(s) must, of course, be inert to the other components of the light-sensitive composition, be capable of taking into solution any binder that may optionally be included, and be inert to and not dissolve the substrate to which the photosensitive material is applied.

Binders which may optionally be added to the invention composition are inert, transparent materials that serve to adhere the leuco dye-dimer mixture to a substrate. The binder may serve also to thicken the solution of the composition should this be desirable for specific applications. Representative binders that will be found applicable include ethyl cellulose, polyvinyl alcohol, polyvinyl chloride, polystyrene, polyvinyl acetate, polymethyl methacrylate, cellulose acetate, cellulose nitrate, chlorinated rubber, copolymers of vinyl monomers, gelatin. A binder will be used in an amount varying from about 0.5 part to 10 parts by weight per part of combined weight of leuco dye and dimer. Preferred binders are those which are soft and plasticized or permeated by the solvent and color forming reactants employed.

The substrates are inert materials which bear the light-sensitive, image-forming compositions as a coating or impregnant. They include paper ranging from tissue paper to heavy cardboard, films of plastics and polymeric materials such as regenerated cellulose, cellulose acetate, cellulose nitrate, polyester of glycol and terephthalic acid, polyethylene, polyvinyl acetate, polymethyl methacrylate, polyvinyl chloride, textile fabrics, glass, wood, and metals. Opaque as well as transparent substrates will be used. Reactive resins, drying oils, and other agents which may interfere with image formation by the light-sensitive composition are to be avoided.

Representative examples illustrating the present invention follow; parts and percentages mentioned are by weight.

EXAMPLE I.—Bis(4-diethylamino-o-tolyl)
(p-benzylthiophenyl)methane

A reaction vessel is charged with 40 parts of methanol, 4.9 parts of 35% aqueous hydrochloric acid, 3.0 parts of urea, 16.3 parts of N,N-diethyl-m-toluidine, and 11.4 parts of p-benzylthiobenzaldehyde. The reaction mass is refluxed for 16 hours and then cooled and drowned in 45 parts of water. The resulting solution is made alkaline to Brilliant Yellow paper with sodium hydroxide solution, and 21.5 parts of bis(4-diethylamino-o-tolyl) (p-benzylthiophenyl)methane is precipitated. When washed with cold methanol and dried at 50° C. the white powder melts at 92° to 93° C. and has the following analysis:

Calculated for $C_{36}H_{44}N_2S$: C, 80.5%; H, 8.3%; N, 5.2%; S, 6.0%. Found: C, 80.4%; H, 8.1%; N, 5.2%; S, 5.9%.

Dihydrochloride salt 10.0 parts of the above leuco dye base are slurried in 150 parts of carbon tetrachloride at room temperature, and anhydrous hydrogen chloride is added until no further addition takes place. The white solid changes to a gummy precipitate during this period. The solvent is decanted from this precipitate, and then washed with dry ethyl ether. It is then ground in a mortar under ether, to give 11.25 parts of a white powder, which is the dihydrochloride of bis(4-diethylamino-o-tolyl) (p-benzylthiophenyl)methane.

Calculated for $C_{36}H_{44}N_2S \cdot 2HCl$: C, 70.1%; H, 7.6%; N, 4.6%; S, 5.3%; Cl, 11.6%. Found: C, 70.3%; H, 7.5%; N, 4.3%; S, 5.2%; Cl, 11.6%.

The above leuco dye dihydrochloride is photochemically oxidized on paper when the latter is immersed briefly in a solution prepared as described below, dried by infrared heat to remove most of the solvent, and irradiated with light of 2537 to 4200 A. A gray to black color results on the irradiated portion, the intensity of the color being a function of the amount of irradiation. The photosensitive composition consists of:

| | Parts |
|---|---|
| Leuco dye dihydrochloride | 1 |
| Dimer of 2-(o-chlorophenyl)-4,5-diphenyl-imidazolyl | 1 |
| Methanol | 20 |
| Dimethylformamide | 78 |

Another method of photolytically generating color consists of dissolving one part of the leuco dye base in 50 parts of carbon tetrabromide, and immersing paper therein for a brief time. Upon drying the paper and irradiating it with light of 2537 to 3100 A., a gray to black image results.

A further method of producing color by irradiating a photosensitive composition with ultraviolet light comprises dissolving one part of the cyanomethane base form of the subject leuco dye and 15 parts of triallylcyanurate in a mixture of 59 parts of dioxane and 25 parts of a 20% solution of cellulose acetate butyrate in a 50—50 mixture of toluene and ethyl acetate. The composition is applied to paper and dried. On exposure to ultraviolet light a gray to black color is formed. Besides triallylcyanurate may be used a cyanuric acid compound having the formula

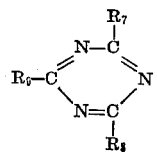

wherein $R_9$, $R_7$, and $R_8$ are hydroxy, chlorine, or OY wherein Y is alkyl, alkenyl, cycloalkyl, aryl, aralkyl or alkaryl having up to 18 carbon atoms, and preferably where the R groups are the same in any given compound. This group of compounds includes cyanuric acid, cyanuric chloride, trimethylcyanurate, triethylcyanurate, tributylcyanurate, tricyclohexylcyanurate, triphenylcyanurate, tritolylcyanurate, tribenzylcyanurate.

Oxalate salt

To a solution of 5.4 parts of the subject bis(4-diethylamino-o-tolyl) (p-benzylthiophenyl)methane in 40 parts of methanol is added a solution of 3.8 parts of oxalic acid dihydrate in 40 parts of methanol. A resinous precipitate forms at once and is isolated by trituration with ethyl ether whereupon a crystalline white solid forms.

This is the dioxalate salt of the basic compound having the empirical formula $$C_{36}H_{44}N_2S \cdot 2H_2C_2O_4 \cdot 1.5H_2O$$

confirmed by analysis:
Calculated: C, 64.6%; H, 6.9%; N, 3.8%; S, 4.3%. Found: C, 64.5%; H, 6.6%; N, 3.6%; S, 4.1%.

p-Toluenesulfonate salt

The p-toluenesulfonic acid salt is prepared by a procedure similar to that employed to form the oxalate, using p-toluenesulfonic acid. A crystalline, white solid is obtained, having the empirical formula $$C_{36}H_{44}N_2S \cdot 2CH_3C_6H_4SO_3H \cdot 1.5H_2O$$

confirmed by analysis:
Calculated: C, 66.1%; H, 7.0%; N, 3.1%; S, 10.6%. Found: C, 66.5%; H, 7.1%; N, 3.1%; S, 10.6%.

Zinc chloride 4.0 parts of the above dye base, i.e., the triphenylmethane derivative, is dissolved in 80 parts of water to which 2.8 parts of 31% aqueous hydrochloric acid solution is added and to the resultant solution is added gradually 22 parts of zinc chloride dissolved in 60 parts of water. On cooling the mixture, the mono zinc chloride derivative of bis(4-diethylamino-o-tolyl)(p-benzylthiophenyl)methane precipitates and is dried to give 6.5 parts of white product, which is oxidized with lead dioxide to give a black dye.

Phosphotungstate salt

One part of the above dye base is dissolved in a solution of one part of glacial acetic acid in 104 parts of water at 85° C. To this solution is added a hot solution of four parts of sodium tungstate, 0.35 part of disodium phosphate heptahydrate and three parts of 36% hydrochloric acid in 50 parts of water, and the mixed solutions are heated at the boiling point for five minutes. Upon cooling, the insoluble phosphotungstate salt precipitates. It is isolated and washed with water. It dries to a white powder. When dissolved in dimethylformamide to give a 1% solution and applied to paper, the paper is uncolored but upon oxidation with chloranil, a gray dye rapidly develops.

Oxidation dye product

The above bis(4-diethylamino-o-tolyl)(p-benzylthiophenyl)methane in an amount of one part is added to 40 parts of methanol with concentrated (36%) hydrochloric acid to effect solution. To this solution is added one part of lead dioxide ($PbO_2$). The mixture is allowed to react for about five minutes at room temperature, it is filtered, and the filter cake is washed with methanol. Evaporation of the filtrate and washings yields a black powder which is readily soluble in water and methanol. The visible absorption spectrum of solutions of the dye shows strong overlapping absorption bands having maximum absorption at 648 and 499 m$\mu$ with an intensity ratio of 2.3. A 0.5% solution of the dye colors paper an attractive gray shade.

This dye and related dyes are useful in hectograph compositions. A mixture of 40 parts of the oxidized leuco dye, bis(4-diethylamino - o - tolyl)(p-benzylthiophenyl)methane, 40 parts of Carnauba wax, and 20 parts of petroleum jelly is rubbed fine, melted at a temperature of about 80° C., and applied as a coating to paper to provide a hectograph master sheet. This master sheet is then used in conventional spirit duplicating devices, and dye is transferred to the duplicate sheet by means of volatile alcohol transfer media to give desirable black images.

Phosphotungstate dye pigment

One part of the above dye is dissolved in 104 parts of water containing one part of glacial acetic acid and treated with sodium tungstate and sodium phosphate under the conditions described above for preparing phosphotungstate salt of the dye in the reduced state. The dry, black powdery product is the dye pigment. It is insoluble in water, but dissolves in dimethylformamide to provide a solution with which paper is dyed gray.

EXAMPLE II.—Bis(4-diethylamino-o-tolyl)(p-benzylthiophenyl)methanol

The oxidation dye product of Example 1 in the amount of one part is dissolved in 200 parts of water. The solution is heated to 50° C. and gradually added to 264 parts of 30% aqueous sodium hydroxide solution. When the addition is complete, the resultant solution is agitated for about an hour and cooled. The precipitated material, collected and dried at 50° C., amounts to one part of product having the formula

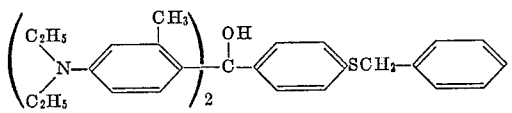

The presence of the OH group is confirmed by infrared analysis. An acetone solution of the product is essentially colorless. By oxidation in acid the original gray dye is obtained.

EXAMPLE III.—Bis(4-diethylamino-o-tolyl)(p-benzylthiophenyl)cyanomethane

The oxidation dye product of Example I in an amount of two parts is dissolved in 100 parts of water, and the solution is blanketed with nitrogen. To the solution is then added 0.4 part of potassium cyanide, and the mixture is agitated for four hours. The precipitate that forms is isolated, washed, and dried and yields 1.4 parts of white powder which has the formula

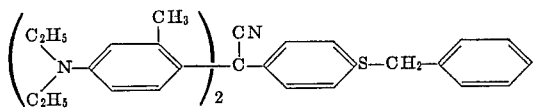

Infrared analysis confirms the presence of the

group. When a colorless methanol/dimethylformamide solution is applied to paper it produces a colorless spot which on irradiation with ultraviolet light slowly turns gray.

EXAMPLE IV.—Bis(4-diethylamino-2-fluorophenyl)(p-benzylthiophenyl)methane dihydrochloride A reaction vessel is charged with 80 parts of methanol, 11.4 parts of p-benzylthiobenzaldehyde, and 16.7 parts of N,N-diethyl-m-fluoroaniline. The solution is agitated under nitrogen while 4.9 parts of 36% aqueous hydrochloric acid is added gradually at room temperature followed by the addition of three parts of urea. The reaction mass is refluxed for 16 hours, cooled, made alkaline to Brilliant Yellow paper with sodium carbonate, and steam distilled. The resinous residue is washed with cold water and dissolved in 70 parts of ethyl ether. The ether solution is clarified by passage through activated carbon and treated with anhydrous hydrogen chloride. The pale green solid which precipitates in an amount of 24 parts has the formula

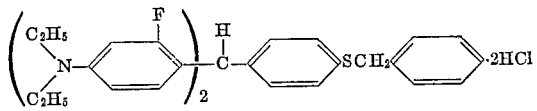

Oxidation of this product with lead dioxide in methanol solution yields a gray dye which is readily adsorbed by paper. The dye exhibits absorption bands with maxima at 620 mμ and 493 mμ having an intensity ratio of 2.2

EXAMPLE V.—Bis(4-didodecylamino-o-tolyl)(p-benzylthiophenyl)methane

By the procedure of Example 1, 8.9 parts of N,N-didodecyl-m-toluidine and 2.3 parts of p-benzylthiobenzaldehyde are reacted in 60 parts of methanol containing one part of 36% aqueous hydrochloric acid and 0.6 part of urea to form the subject compound as a viscous oil. The product is oxidized in an acid methanol solution with lead dioxide to a dye which imparts a gray color to paper treated with the solution.

EXAMPLE VI.—Bis[4 - bis(2 - hydroxyethyl)amino - 2-fluorophenyl](p - benzylthiophenyl)methane dihydrochloride By the procedure of Example I, 14 parts of m-fluoro-N,N-bis(2-hydroxyethyl)aniline are reacted with 7.5 parts of p-benzylthiobenzaldehyde to provide 8.8 parts of product having the formula

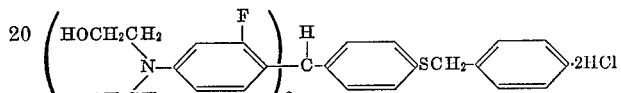

On oxidation in methanol solution, the subject compound gives a bluish gray dye which readily colors paper.

EXAMPLE VII.—Bis[4-([2-cyanoethyl][2-hydroxyethyl]amino)-o-tolyl](p-benzylthiophenyl)methane As described in Example I, 4.1 parts of N-(2-cyanoethyl)-N-(2-hydroxyethyl)-m-toluidine are reacted with 2.3 parts of p-benzylthiobenzaldehyde to yield 4.5 parts of the subject compound as a white solid having the formula

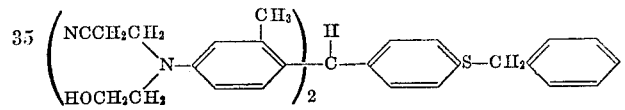

Oxidation of this leuco dye gives a purple gray coloring material which imparts this color to paper immersed in a solution of the dye.

EXAMPLE VIII.—Bis(4-diethylamino-2-ethylphenyl)(p-benzylthiophenyl)methane dihydrochloride Under the conditions set forth in Example I, 7.1 parts of N,N-diethyl-m-ethylaniline and 4.6 parts of p-benzylthiobenzaldehyde are reacted to form a leuco dye in the form of its dihydrochloride having the structure

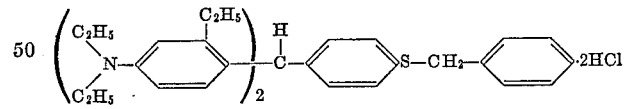

The product is a white powder which is readily oxidized to the corresponding dye having a black color.

A solution of the dye is gray, and paper sprayed with it is colored gray. The dye exhibits well defined absorption bands at 648 mμ and 500 mμ with an intensity ratio of 1.9.

EXAMPLE IX.—Bis(4-diethylamino-o-tolyl)[p(p-chlorobenzylthio)phenyl]methane

As in the preceding examples, 16.3 parts of N,N-diethyl-m-toluidine and 13.2 parts of p-(p-chlorobenzylthio)benzaldehyde are reacted and form 4.5 parts of a white powder having a melting range of 75° to 77° C. and the following formula

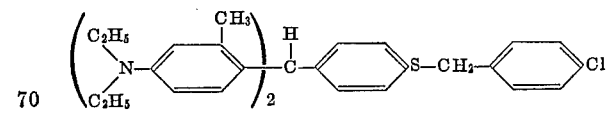

Confirmatory analytical results are:
Calculated for $C_{36}H_{43}N_2ClS$: C, 75.9%; H, 7.5%; N, 4.9%; Cl, 6.1%; S, 5.6%. Found: C, 76.3%; H, 7.7%; N, 5.0%; Cl, 6.4%; S, 5.7%.

On oxidation in methanol solution, this leuco dye gives a gray colored solution.

EXAMPLE X.—Bis(4-diethylamino-o-tolyl) [p-(p-methylbenzylthio)phenyl]methane dihydrochloride By the procedure of Example I, 16.3 parts of N,N-diethyl-m-toluidine and 12.1 parts of p-(p-methylbenzylthio)benzaldehyde are reacted to form the subject hydrochloride salt of leuco dye as a white solid in an amount of 22 parts. The oxidized product of this compound is a black dye which imparts a gray color to paper.

EXAMPLE XI.—Bis(4-diethylamino-o-tolyl)(p-methylthiophenyl)methane dihydrochloride By the procedure of Example I, 16.3 parts of N,N-diethyl-m-toluidine and 7.6 parts of p-methylthiobenzaldehyde are reacted to give 10.4 parts of leuco dye. The oxidized product of the compound is a black solid which imparts a gray color to paper.

EXAMPLE XII.—Bis(4-diethylamino-o-tolyl)(p-octylthiophenyl)methane dihydrochloride The above compound is prepared by reacting 19.6 parts of N,N-diethyl-m-toluidine and 15 parts of p-octylthiobenzaldehyde in methanol in the presence of hydrochloric acid and urea as described in Example I. After the reaction mixture is made alkaline, it is steam distilled. The gummy residue is taken up in isopropyl alcohol and purified by contact with activated charcoal and filtering. The clear filtrate is then treated with anhydrous hydrogen chloride. The precipitate that forms, dried at 50° C., is a white powder having the formula

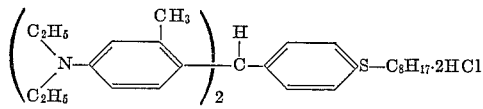

The calculated chlorine content is 11.2%, found 10.5%. This product in water solution is readily oxidized with lead dioxide to a gray-black dye showing high tinctorial strength on paper.

The preceding representative examples may be varied within the scope of the present total specification disclosure, as understood and practiced by one skilled in the art, to achieve essentially the same results.

Additional representative specie compounds which are part of the present generic invention include the following:

Bis[4-bis(2-propoxyethyl)amino-2-fluorophenyl](p-benzylthiophenyl)methane,
Bis[4-bis(4-butoxybutyl)amino-o-tolyl](p-butylthiophenyl)methane,
Bis[4-(N-methyl-N-naphthylamino)-o-tolyl]p-(1-naphthylthio)phenylmethane,
Bis[4-(N-methoxymethyl)-N-methylamino-2-ethylphenyl]-(p-benzylthiophenyl)cyanomethane, and
Bis[4-bis(3-hydroxypropyl)amino-o-tolyl](p-hexylthiophenyl)methanol.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A leuco dye having the formula

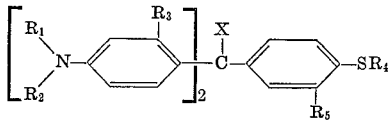

wherein $R_1$ and $R_2$ are selected from the group consisting of $C_1$ to $C_{12}$ alkyl, 2-cyanoethyl, 2-hydroxyethyl, 3-hydroxypropyl, $C_1$ to $C_4$ alkoxy ($C_1$ to $C_4$)alkyl, phenyl alkyl, naphthalkyl, phenyl and naphthyl; $R_3$ is selected from the group consisting of methyl, ethyl and fluorine; X is selected from the group consisting of hydrogen, hydroxy and cyano; $R_4$ is selected from the group consisting of $C_1$ to $C_8$ alkyl, aralkyl, aryl and mono- and disubstituted aralkyl, the substituents of said substituted aralkyl being selected from the group consisting of fluoro, chloro, alkyl and alkoxy substituents; $R_5$ is selected from the group consisting of hydrogen and $C_1$ to $C_4$ alkyl.

2. A leuco dye as defined in claim 1 wherein $R_3$ is methyl.

3. A leuco dye having the formula

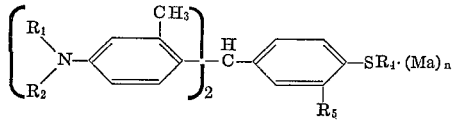

wherein $R_1$ and $R_2$ are selected from the group consisting of $C_1$ to $C_{12}$ alkyl, 2-cyanoethyl, 2-hydroxyethyl, 3-hydroxypropyl, $C_1$ to $C_4$ alkoxy($C_1$ to $C_4$)alkyl, phenylalkyl, naphthalkyl, phenyl and naphthyl; $R_4$ is selected from the group consisting of $C_1$ to $C_8$ alkyl, aralkyl, aryl and mono- and disubstituted aralkyl, the substituents of said substituted aralkyl being selected from the group consisting of fluoro, chloro, alkyl and alkoxy substituents; $R_5$ is selected from the group consisting of hydrogen and $C_1$ to $C_4$ alkyl; M is selected from the group consisting of hydrogen and zinc cation; A is a salt-forming anion and $n$ is an integer from 1 to 2.

4. A dye of the formula

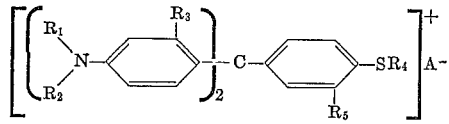

wherein $R_1$ and $R_2$ are selected from the group consisting of $C_1$ to $C_{12}$ alkyl, 2-cyanoethyl, 2-hydroxyethyl, 3-hydroxypropyl, $C_1$ to $C_4$ alkoxy($C_1$ to $C_4$)alkyl, phenylalkyl, naphthalkyl, phenyl and naphthyl; $R_3$ is selected from the group consisting of methyl, ethyl and fluorine; $R_4$ is selected from the group consisting of $C_1$ to $C_8$ alkyl, aralkyl, aryl and mono- and disubstituted aralkyl, the substituents of said substituted aralkyl being selected from the group consisting of fluoro, chloro, alkyl and alkoxy substituents; $R_5$ is selected from the group consisting of hydrogen and $C_1$ to $C_4$ alkyl; and $A^-$ is salt-forming anion.

References Cited

UNITED STATES PATENTS 2,755,203   7/1956   Stallman _____ 260—393 X

FOREIGN PATENTS 175,894   6/1935   Switzerland.

LORRAINE A. WEINBERGER, *Primary Examiner.*

H. C. WEGNER, *Assistant Examiner.*

U.S. Cl. X.R.

8—7; 96—90